US011660714B2

(12) United States Patent
Varrelmann

(10) Patent No.: US 11,660,714 B2
(45) Date of Patent: May 30, 2023

(54) PROCESSING STATION

(71) Applicant: Broetje-Automation GmbH, Rastede (DE)

(72) Inventor: Nils Varrelmann, Varel (DE)

(73) Assignee: Broetje-Automation GmbH, Rastede (DE)

(*) Notice: Subject to any disclaimer, the term of this patent is extended or adjusted under 35 U.S.C. 154(b) by 416 days.

(21) Appl. No.: 15/752,371

(22) PCT Filed: Aug. 8, 2016

(86) PCT No.: PCT/EP2016/068855
§ 371 (c)(1),
(2) Date: Feb. 13, 2018

(87) PCT Pub. No.: WO2017/025497
PCT Pub. Date: Feb. 16, 2017

(65) Prior Publication Data
US 2019/0001398 A1 Jan. 3, 2019

(30) Foreign Application Priority Data

Aug. 13, 2015 (DE) .................. 20 2015 104 273.6

(51) Int. Cl.
*B23Q 1/01* (2006.01)
*B64F 5/10* (2017.01)
*B21J 15/14* (2006.01)

(52) U.S. Cl.
CPC .......... *B23Q 1/012* (2013.01); *B21J 15/142* (2013.01); *B64F 5/10* (2017.01); *Y10T 29/5107* (2015.01);
(Continued)

(58) Field of Classification Search
CPC ............ Y10T 29/5105; Y10T 29/5107; Y10T 409/307168; Y10T 409/307784;
(Continued)

(56) References Cited

U.S. PATENT DOCUMENTS 3,154,979 A 11/1964 Crispin et al.
3,559,530 A * 2/1971 Wagner ..................... B23C 1/00
409/190
(Continued)

FOREIGN PATENT DOCUMENTS

CN 101817146 9/2010
DE 19859679 6/2000
(Continued)

OTHER PUBLICATIONS

German Search Report for priority application No. 20 2015 104 273.6, dated Jun. 3, 2016 (4 pages).
(Continued)

*Primary Examiner* — Boyer D Ashley
*Assistant Examiner* — Michael Vitale
(74) *Attorney, Agent, or Firm* — Pauly, DeVries Smith & Deffner LLC

(57) ABSTRACT

The disclosure relates to a processing station for aircraft structural components, having a gantry processing machine, a clamping frame for fastening at least one component, and a holding device assembly for receiving the clamping frame, wherein the gantry processing machine has a gantry and the gantry supports a processing tool which defines a processing point, wherein the processing tool is configured so as to be pivotable in relation to the gantry, and wherein the processing tool for displacing the processing point is height adjustable in the z direction in relation to the gantry, wherein the holding device assembly has at least two holding devices, and wherein at least one holding device has a drive for the
(Continued)

height adjustment, and the clamping frame is height-adjustable in the z direction by means of the holding device.

19 Claims, 5 Drawing Sheets

(52) U.S. Cl.
CPC .. *Y10T 29/5118* (2015.01); *Y10T 409/307168* (2015.01); *Y10T 409/308288* (2015.01); *Y10T 409/308344* (2015.01)

(58) Field of Classification Search
CPC . Y10T 409/308344; Y10T 409/308568; Y10T 409/309576; Y10T 409/309632; Y10T 29/5118; B23C 1/04; B23C 1/08; B23C 1/10; B64F 5/10; B21J 15/142
USPC ..... 29/26 A, 26 R, 34 B; 409/192, 202, 203, 409/212, 213, 217, 235, 236
See application file for complete search history.

(56) References Cited

U.S. PATENT DOCUMENTS

| | | | |
|---|---|---|---|
| 3,858,731 A | 1/1975 | Briggs | |
| 4,728,229 A * | 3/1988 | Memmel | B23B 39/161 408/46 |
| 4,753,555 A | 6/1988 | Yousko et al. | |
| 4,759,109 A | 7/1988 | Mason et al. | |
| 4,861,984 A | 8/1989 | West | |
| 4,966,323 A | 10/1990 | Weaver et al. | |
| 5,163,793 A * | 11/1992 | Martinez | B23Q 1/037 409/219 |
| 5,231,747 A | 8/1993 | Givler et al. | |
| 5,329,691 A | 7/1994 | Zienkiewicz et al. | |
| 5,339,152 A | 8/1994 | Horn et al. | |
| 5,404,633 A | 4/1995 | Givler et al. | |
| 5,699,599 A | 12/1997 | Zieve et al. | |
| 5,701,651 A | 12/1997 | Nelson et al. | |
| 5,778,505 A | 7/1998 | Reilly et al. | |
| 5,848,458 A * | 12/1998 | Bullen | B23P 21/004 29/33 K |
| 5,910,894 A | 6/1999 | Pryor | |
| 5,914,876 A * | 6/1999 | Hirai | G05B 19/408 700/181 |
| 5,917,726 A | 6/1999 | Pryor | |
| 5,920,974 A | 7/1999 | Bullen et al. | |
| 6,001,181 A * | 12/1999 | Bullen | B05C 5/0216 118/323 |
| 6,223,413 B1 | 5/2001 | Crocker et al. | |
| 6,237,212 B1 * | 5/2001 | Speller, Jr. | B21J 15/10 227/27 |
| 6,254,317 B1 * | 7/2001 | Chang | B23B 39/006 408/1 R |
| 6,775,987 B2 | 8/2004 | Wolf et al. | |
| 7,444,728 B2 | 11/2008 | Wesseloh | |
| 7,507,059 B2 | 3/2009 | Hamann | |
| 7,566,193 B2 * | 7/2009 | Haj-Fraj | B23Q 1/4876 409/216 |
| 7,682,112 B2 * | 3/2010 | Panczuk | B23Q 1/01 409/132 |
| 8,220,134 B2 | 7/2012 | Matheis et al. | |
| 8,302,321 B2 | 11/2012 | Hunter et al. | |
| 8,978,231 B2 | 3/2015 | Lemieux | |
| 9,157,735 B2 | 10/2015 | Haisty et al. | |
| 9,272,338 B2 | 3/2016 | Fujita et al. | |
| 9,868,549 B2 | 1/2018 | Frauen et al. | |
| 11,014,142 B2 | 5/2021 | Varrelmann | |
| 11,014,212 B2 | 5/2021 | Ficken et al. | |
| 2002/0113354 A1 | 8/2002 | Mangelsen et al. | |
| 2004/0090635 A1 | 5/2004 | Franz et al. | |
| 2004/0093731 A1 | 5/2004 | Sarh et al. | |
| 2006/0039765 A1 * | 2/2006 | Hamann | B64F 5/10 408/87 |
| 2006/0182557 A1 * | 8/2006 | Frauen | B21J 15/142 414/349 |
| 2006/0230609 A1 | 10/2006 | Wang et al. | |
| 2007/0153296 A1 | 7/2007 | Schick | |
| 2007/0274797 A1 | 11/2007 | Panczuk et al. | |
| 2008/0254959 A1 * | 10/2008 | Takayama | B23Q 3/12 483/32 |
| 2010/0011563 A1 | 1/2010 | Burns et al. | |
| 2013/0192050 A1 | 8/2013 | Lemieux | |
| 2013/0336737 A1 * | 12/2013 | Fujita | B23B 39/168 408/87 |
| 2014/0095107 A1 | 4/2014 | Haisty et al. | |
| 2014/0253913 A1 | 9/2014 | Bergman et al. | |
| 2017/0151643 A1 | 6/2017 | Ficken et al. | |
| 2017/0333976 A1 | 11/2017 | Varrelmann | |
| 2018/0297107 A1 | 10/2018 | Meiners | |

FOREIGN PATENT DOCUMENTS

| | | |
|---|---|---|
| DE | 102005023353 | 1/2006 |
| DE | 102008044262 | 6/2010 |
| DE | 202013003544 | 8/2014 |
| DE | 102013006506 | 10/2014 |
| EP | 0566770 | 10/1993 |
| EP | 0956915 | 11/1999 |
| EP | 2792431 | 10/2014 |
| GB | 712624 | 7/1954 |
| WO | 9937429 | 7/1999 |
| WO | 2016174133 | 11/2016 |

OTHER PUBLICATIONS

German Search Report for priority application No. DE102014113663.2 dated Sep. 2, 2015 (8 pages).
German Search Report for priority application No. DE102015106543.6 dated Sep. 16, 2015 (9 pages).
International Preliminary Report on Patentability for corresponding PCT application No. PCT/EP2015/063777 dated Dec. 20, 2016 (7 pages), English translation.
International Preliminary Report on Patentability for PCT Application No. PCT/EP2016/059480 dated Oct. 31, 2017 (6 pages), English translation.
International Preliminary Report on Patentability for PCT/EP2015/071688 dated Apr. 6, 2017 (8 pages).
International Search Report and Written Opinion for corresponding PCT application No. PCT/EP2015/063777 dated Sep. 11, 2015 (10 pages).
International Search Report and Written Opinion for corresponding PCT application No. PCT/EP2015/071688 dated Dec. 2, 2015 (12 pages).
International Search Report and Written Opinion for corresponding PCT application No. PCT/EP2016/068855, dated Nov. 18, 2016 (10 pages).
International Search Report and Written Opinion for PCT Application No. PCT/EP2016/059480 dated Aug. 29, 2016 (20 pages) with English translation.
Communication Pursuant to Article 94(3) EPC for European Patent Application No. 1573104.3, dated Feb. 14, 2018 (6 pages), no translation available.
Communication Pursuant to Article 94(3) EPC for European Patent Application No. 15731034.3 dated Jul. 26, 2018 (5 pages) No English Translation.
Non-Final Office Action for U.S. Appl. No. 15/319,094 dated May 2, 2019 (39 pages).
Final Office Action for U.S. Appl. No. 15/319,094 dated Oct. 3, 2019 (26 pages).
Non-Final Office Action for U.S. Appl. No. 15/513,244 dated Sep. 17, 2019 (36 pages).
Response to Non-Final Rejection dated May 2, 2019 for U.S. Appl. No. 15/319,094, submitted via EFS-Web dated Sep. 3, 2019, 10 pages.
Non-Final Office Action for U.S. Appl. No. 15/569,357 dated Jan. 22, 2020 (33 pages).

(56) References Cited

OTHER PUBLICATIONS

Response to Final Rejection dated Oct. 3, 2019 for U.S. Appl. No. 15/319,094, submitted via EFS-Web dated Mar. 3, 2020, 11 pages.
Response to Non-Final Rejection dated Sep. 17, 2019 for U.S. Appl. No. 15/513,244, submitted via EFS-Web dated Jan. 17, 2020, 10 pages.
Final Office Action for U.S. Appl. No. 15/513,244 dated May 1, 2020 (20 pages).
Non-Final Office Action for U.S. Appl. No. 15/319,094 dated Apr. 30, 2020 (22 pages).
Final Office Action for U.S. Appl. No. 15/569,357 dated Aug. 7, 2020 (15 pages).
Response to Non-Final Rejection dated Jan. 22, 2020 for U.S. Appl. No. 15/569,357, submitted via EFS-Web dated Jun. 22, 2020, 9 pages.
Response to Final Rejection dated May 1, 2020 for U.S. Appl. No. 15/513,244, submitted via EFS-Web dated Sep. 1, 2020, 10 pages.
Notice of Allowance for U.S. Appl. No. 15/319,094 dated Feb. 12, 2021 (11 pages).
Notice of Allowance for U.S. Appl. No. 15/513,244 dated Jan. 12, 2021 (22 pages).
Response to Non-Final Rejection (Ex Parte Quayle), mailed on Nov. 23, 2020 for U.S. Appl. No. 15/319,094, submitted via EFS-Web on Jan. 20, 2021, 7 pages.
Ex Parte Quayle Action for U.S. Appl. No. 15/319,094 mailed Nov. 23, 2020 (6 pages).
Response to Non-Final Rejection dated Apr. 30, 2020 for U.S. Appl. No. 15/319,094, submitted via EFS-Web dated Oct. 30, 2020, 13 pages.

* cited by examiner

PROCESSING STATION

CROSS-REFERENCE TO RELATED APPLICATIONS

This application is a national stage application under 35 U.S.C. 371 of International Patent Application Serial No. PCT/EP2016/068855, entitled "PROCESSING STATION," filed Aug. 8, 2016, which claims priority from German Patent Application No. DE 20 2015 104 273.6, filed Aug. 13, 2015, the disclosure of which is incorporated herein by reference.

FIELD OF THE TECHNOLOGY

The disclosure relates to a processing station for aircraft structural components.

BACKGROUND

Various processing stations for aircraft structural components are known from the prior art. For example, a processing station having a gantry riveting machine for aircraft structural components is described in EP 0 956 915 A2. In the case of this processing station, holding devices which are adaptable to the contour of the frame to be held of the aircraft structural part to be manufactured are provided, the frames being individually fixed to said holding devices.

Moreover, processing stations having holding devices are known in which the components of an aircraft structural component to be manufactured, for example frames and/or planks, are not received directly by the holding devices but are releasably fixed in clamping frames which for processing are subsequently lifted into the holding devices.

Aircraft structural components are generally very large. The dimensions of the processing stations for said aircraft structural components depend significantly on the size of the aircraft structural components to be machined. When comparatively large aircraft structural components are to be machined, the gantry in the basic layout, for example of a gantry processing machine, is typically increased in height in order for the adjustment range of the processing tool to be enlarged, and the linear height guide of the processing tool that is supported by the gantry is extended in length. In consequence, both measures require a vertical increase in the height of the gantry processing machine. The height of the shed or a crane track here typically represents the limiting dimension of the adjustment range. If the ceiling height is not sufficient in order for an aircraft structural component to be completely machined on a gantry processing machine, a further gantry processing machine is required, the adjustment range of the latter being disposed in an offset manner in relation to the first, relative to the aircraft structural component, the further region of the aircraft structural component being able to be machined on said further gantry processing machine. This leads to significant losses in productivity.

SUMMARY

The disclosure is based on the object of providing a flexible and compact processing station having an adjustment range that is as large as possible for the productive and cost-effective manufacturing of various, even very large aircraft structural components.

The above object is achieved by a processing station having the features as described herein.

The processing station according to the proposal has a gantry processing machine, a clamping frame for fastening at least one component, and a holding device assembly for receiving the clamping frame. The clamping frame enables the component or the component parts of the component to be releasably fixed and aligned on the clamping frame outside the gantry processing machine. On account thereof, tooling times on the processing machine are reduced and the productivity is increased.

The gantry processing machine furthermore has a gantry which supports a processing tool which defines a processing point. The processing tool is configured so as to be pivotable in relation to the gantry and for displacing the processing point is height adjustable in the z direction in relation to the gantry.

The holding device assembly moreover has at least two holding devices. At least one holding device of the holding device assembly has a drive for the height adjustment. On account thereof, the clamping frame is at least in part height-adjustable in the z direction by means of the holding devices.

On account of both the processing tool being height adjustable in the z direction as well as the clamping frame being height adjustable in the z direction by means of the at least one height-adjustable holding device, the resulting adjustment range in the z direction can be increased overall without the gantry and the linear height guide of the latter having to be modified.

By fixing the component, in particular the component parts thereof, on the clamping frame, said component or component parts, respectively, remain precisely aligned when being height adjusted, enabling a high manufacturing productivity even in the case of a height adjustment of the at least one holding device.

Overall, a compact machine design offering high component flexibility and a large adjustment range and thus a productive and cost-effective manufacturing of various, even very large aircraft structural components is enabled.

In various embodiments, the holding device assembly has at least two holding devices having in each case at least one drive for the height adjustment, and the clamping frame is height adjustable in the z direction by means of the holding devices. On account thereof, a symmetrical, in particular parallel, height adjustment of the clamping frame is enabled.

In some embodiments, the gantry processing machine has an adjustment range in the z direction. The holding device assembly, conjointly with the clamping frame, has an adjustment range in the z direction. The two adjustment ranges can overlap in such a manner that a consistent processing location of the component is processable by way of the gantry processing machine in a higher and a lower position of the holding device or holding devices, respectively, in the z direction.

According to various embodiments, the processing station can be specified and configured in such a manner that a component having a defined contour, which is to be processed at at least two processing locations, and in which the two processing locations in the z direction are spaced apart by more than the size in the z direction of the adjustment range of the gantry processing machine for this component, is processable by the gantry processing machine at both processing locations by a height adjustment of the clamping frame. A very large overall adjustment range of the processing station in the z direction is achieved in this way.

Various embodiments provide that at least one holding device extends in a longitudinal manner and by way of the longitudinal side thereof is aligned along the x direction, and/or that the clamping frame extends in a longitudinal manner and is received in the holding device assembly in such a manner that the longitudinal side of said clamping frame is aligned in the x direction. In this way, a lower tool of the gantry processing machine can be readily disposed and/or moved between the holding devices.

The holding devices can have in each case at least one lifting element, such as two lifting elements, for the height adjustment. The lifting elements furthermore can be individually driven and/or individually controllable. A height adjustment of the clamping frame that is adapted individually to the component geometry is possible on account thereof. In particular, an inclination of the component is possible by way of driving the lifting elements in a dissimilar manner.

In some embodiments, the processing station has a controller for the height adjustment of the clamping frame, and/or that the processing station has a controller, in particular an NC controller, for the motion control of the gantry processing machine and/or of the holding device assembly. The motion control of the holding device assembly can be coupled, in particular functionally coupled, to the motion control of the gantry processing machine. Controlling the entire processing station can be performed by way of an NC controller. Particular efficient controlling of the processing station is enabled on account thereof.

The above object is moreover achieved by a processing station having the features as described herein. Loading and unloading the holding device assembly with clamping frame can be facilitated by a pivot joint on at least one holding device, on the one hand, and the adjustment range in the z direction can be enlarged by partially pivoting the pivot joint, on the other hand. The loading and unloading by said pivoting for loading to and unloading can be carried out, for example, also with a floor-borne transportation vehicle instead of a crane. In this instance, in the case of a limited shed height, it is possible for the gantry to be dimensioned in a larger manner, since the provision of a crane track for loading and unloading the holding device assembly with the clamping frame is no longer required between the gantry and the ceiling of the shed. The operating range of the machine can be enlarged.

The processing station can comprise all features that have been described above individually or in a combination thereof. The same advantages can be derived in an analogous manner.

In terms of a method, the above object can be achieved by the method described hereunder.

The method serves for processing an aircraft structural component by way of a processing station, wherein the method comprises the following steps:
 a first processing step at a first processing location of a component having a defined contour;
 repositioning the processing tool by way of a motion component in the z direction, and repositioning the component by way of a motion component in the z direction;
 a second processing step at a second processing location of the component, wherein the second processing location in the z direction is higher or lower than the first processing location.

In one refinement of the method, the two processing locations in the z direction are spaced apart farther than the size of the adjustment range of the gantry processing machine for this component in the z direction.

There can be one or a plurality of processing steps of the component between the first and the second processing step.

Various embodiments provide a processing station for aircraft structural components, comprising: a gantry processing machine, a clamping frame for fastening at least one component, and a holding device assembly for receiving the clamping frame, wherein the gantry processing machine has a gantry and the gantry supports a processing tool which defines a processing point, wherein the processing tool is configured so as to be pivotable in relation to the gantry, and wherein the processing tool for displacing the processing point is height adjustable in the z direction in relation to the gantry, wherein the holding device assembly has at least two holding devices, and wherein at least one holding device has a drive for the height adjustment, and the clamping frame is height-adjustable in the z direction by means of the holding device.

In some embodiments, the processing tool of the gantry processing machine is pivotable in relation to the gantry in such a manner that a processing point can be approached by the processing tool in at least two different angular positions of the processing tool.

In some embodiments, the holding device assembly has at least two holding devices having in each case at least one drive for the height adjustment, and the clamping frame is height adjustable in the z direction by means of the holding devices.

In some embodiments, the gantry processing machine has an adjustment range in the z direction, and the holding device assembly, conjointly with the clamping frame, has an adjustment range in the z direction, such that the two adjustment ranges overlap in such a manner that a consistent processing location of the component is processable by way of the gantry processing machine in a higher and a lower position of the holding device or holding devices, respectively, in the z direction.

In some embodiments, the processing station is specified and configured in such a manner that a component having a defined contour, which is to be processed at at least two processing locations, wherein the two processing locations in the z direction are spaced apart by more than the size in the z direction of the adjustment range of the gantry processing machine for this component, is processable by the gantry processing machine at both processing locations by a height adjustment of the clamping frame.

In some embodiments, the gantry processing machine is a boring machine or a riveting machine or a boring/riveting machine.

In some embodiments, the gantry is stationary or repositionable, wherein the gantry is repositionable in an x direction which is disposed so as to be orthogonal to the z direction, furthermore in that the x direction is disposed so as to be orthogonal to a crossbeam of the gantry.

In some embodiments, a pivoting assembly for pivoting the processing tool in relation to the gantry, in particular so as to be parallel with a plane that is defined by the gantry, is provided, wherein the pivoting assembly has a pivot bearing and/or a non-linear guide for pivoting the processing tool in relation to the gantry.

In some embodiments, the pivotable processing tool is an upper tool, the gantry processing machine has a lower tool and the upper tool and the lower tool form a tool assembly, the lower tool being stationary or in particular being repositionable in the x direction, wherein the lower tool is repositionable in particular in the x direction on a slide of the gantry processing machine.

In some embodiments, at least one holding device extends in a longitudinal manner and by way of the longitudinal side thereof is aligned along the x direction, and/or wherein the clamping frame extends in a longitudinal manner and is received in the holding device assembly in such a manner that the longitudinal side of said clamping frame is aligned in the x direction.

In some embodiments, the lower tool, in particular the slide is disposed between the holding devices, in particular so as to be repositionable therebetween.

In some embodiments, the holding devices have in each case at least one lifting element, such as two lifting elements, for the height adjustment, wherein the lifting elements are individually driven and/or are individually controllable.

In some embodiments, at least one holding device, in particular all holding devices, of the holding device assembly is/are repositionable, wherein at least one holding device, in particular all holding devices, of the holding device assembly is/are repositionable in the x direction.

In some embodiments, the holding device assembly has at least two receptacles for receiving the clamping frame, in particular wherein the receptacles for receiving different clamping frames are disposed so as to be displaceable and/or repositionable on the holding device assembly.

In some embodiments, the processing station has a controller for the height adjustment of the clamping frame, and/or wherein the processing station has a controller, in particular an NC controller, for the motion control of the gantry processing machine and/or of the holding device assembly, wherein the motion control of the holding device assembly is coupled, in particular functionally coupled, to the motion control of the gantry processing machine.

Various embodiments provide a processing station for aircraft structural components, in particular as described herein, having a gantry processing machine, a clamping frame for fastening at least one component, and a holding device assembly for receiving the clamping frame, wherein the gantry processing machine has a gantry, and the gantry supports a processing tool which defines a processing point, wherein the processing tool is configured so as to be pivotable in relation to the gantry, and wherein the processing to tool for displacing the processing point is height adjustable in the z direction in relation to the gantry, and wherein the holding device assembly has at least two holding devices, and at least one holding device has a pivot joint for pivoting the clamping frame.

BRIEF DESCRIPTION OF THE DRAWINGS

The disclosure will be explained in more detail hereunder with reference to drawings illustrating exemplary embodiments. In the drawings.

DETAILED DESCRIPTION

Figure 1:
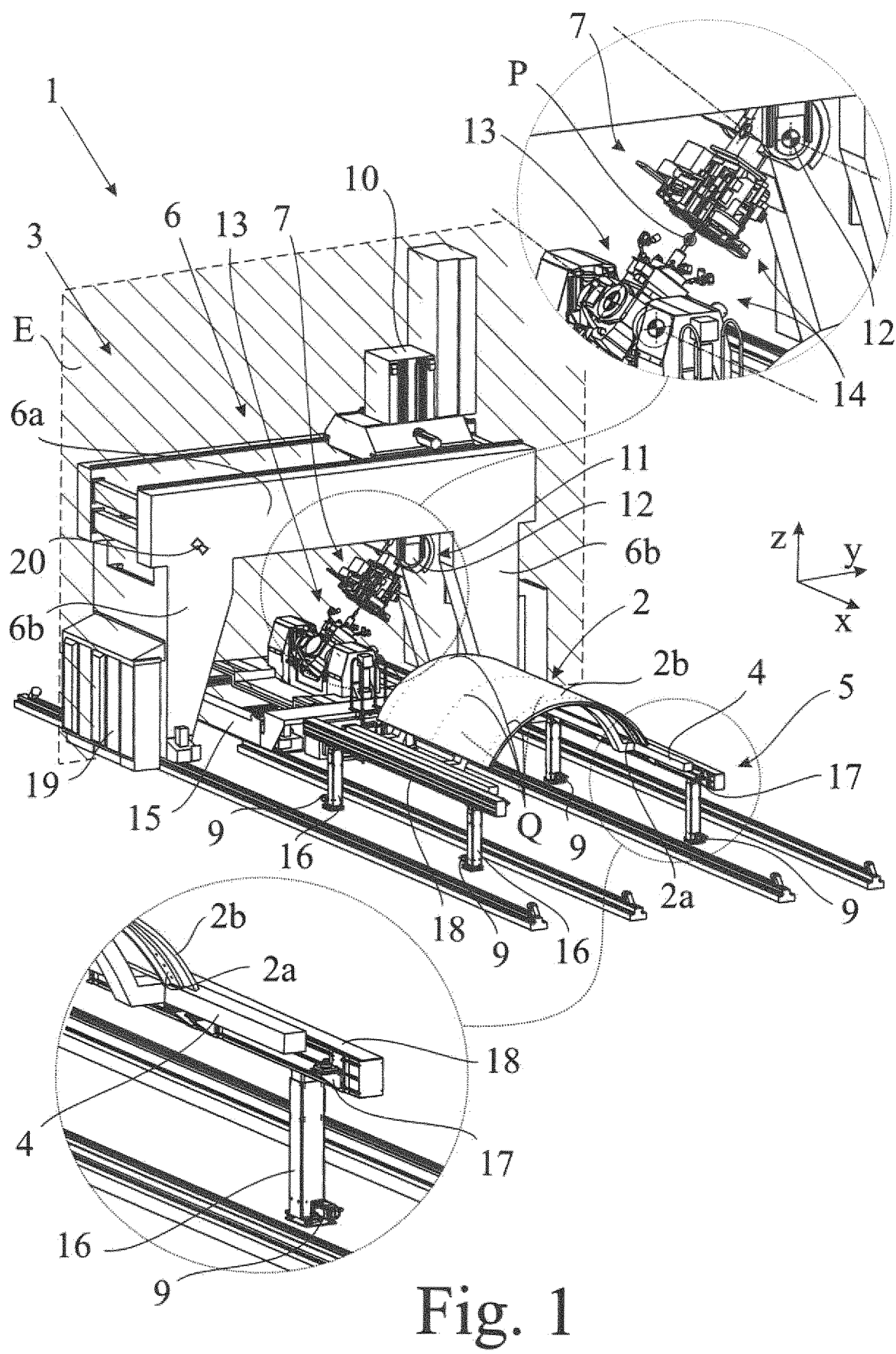
FIG. 1 shows a processing station according to the proposal for aircraft structural components, in a perspective view.

FIG. 1 shows a processing station 1 for aircraft structural components 2 having a gantry processing machine 3, a clamping frame 4 for fastening at least one component 2, and a holding device assembly 5 for receiving the clamping frame 4.

The gantry processing machine 3 in the exemplary embodiment is a boring/riveting machine. The gantry processing machine 3 can however also be another processing machine, for example a boring machine or a riveting machine. Furthermore, the gantry processing machine 3 can be configured as a tape laying machine or a fiber laying machine.

The gantry processing machine 3 has a gantry 6. A processing tool 7 which defines a processing point P is supported by this gantry 6.

The processing tool 7 is configured so as to be pivotable in relation to the gantry 6. Moreover, the processing tool 7 for displacing the processing point P is height adjustable in the z direction in relation to the gantry 6.

The processing tool 7 of the gantry processing machine 3 presently is pivotable in relation to the gantry 6 in such a manner that a processing point P can be approached by the processing tool 7 in at least two different angular positions of the processing tool 7.

The holding device assembly 5 has at least two holding devices 8. At least one of the holding devices 8 has a drive 9 for the height adjustment. The clamping frame 4 is height adjustable in the z direction by means of the at least one height-adjustable holding device 8. The holding device assembly 5 presently has at least two holding devices 8 having in each case at least one drive 9 for the height adjustment, and the clamping frame 4 is height adjustable in the z direction by means of the holding device 8.

The z direction is usually aligned so as to be orthogonal to the floor. The gantry processing machine 3 has an adjustment range VP in the z direction. Furthermore, the holding device assembly 5 conjointly with the clamping frame 4 also has an adjustment range VH in the z direction (cf. FIG. 2).

The adjustment range VP of the gantry processing machine 3 is dependent on the geometry of the component 2 to the extent that a defined alignment to the component 2 has to be assumed by the processing tool 7, for example when riveting or boring. In most instances, the processing tool 7 for processing has to be aligned so as to be perpendicular to the surface of the component 2 at the processing location Q. Consequently, the adjustment range of the gantry processing machine 3 in the context of an overall adjustment range VP in the z direction, that is specific to the contour of a component, is presently composed of a linear adjustment range VL in the z direction and of a pivoting adjustment range VS in the z-direction.

The linear adjustment range VL is in most cases dependent on the length of the linear height guide 10, and the pivoting adjustment range VS is in most instances dependent on the angular position of the processing tool 7 required for the processing location Q to be processed and from the spacing between the processing point P of the processing tool 7 and of the pivot axis/axes A1, B1, A2, B2. When processing, the processing point P defined by the processing tool, and the processing location Q defined by the component, are congruent.

The adjustment range VP of the gantry processing machine 3 and the adjustment range VH of the holding device assembly 5 can overlap in such a manner that a consistent processing location Q of the component 2 is processable by the gantry processing machine 3 in a higher and a lower position of the holding device 8 or holding devices 8, respectively, in the z direction.

The component 2 in the exemplary embodiment is composed of a plurality of component parts, presently frames 2a and planks 2b which are bored and riveted by the gantry processing machine 3.

The component 2 has a defined contour and is processed by the gantry processing machine 3 at at least two processing locations Q1, Q2. The two processing locations Q1 and Q2 in the z direction are spaced apart by more than the size in the z direction of the adjustment range of the gantry processing machine 3 for this component 2. This is highlighted by the upper tool 7 in FIGS. 3 and 4 that is in each case illustrated by dashed lines.

Figure 3:
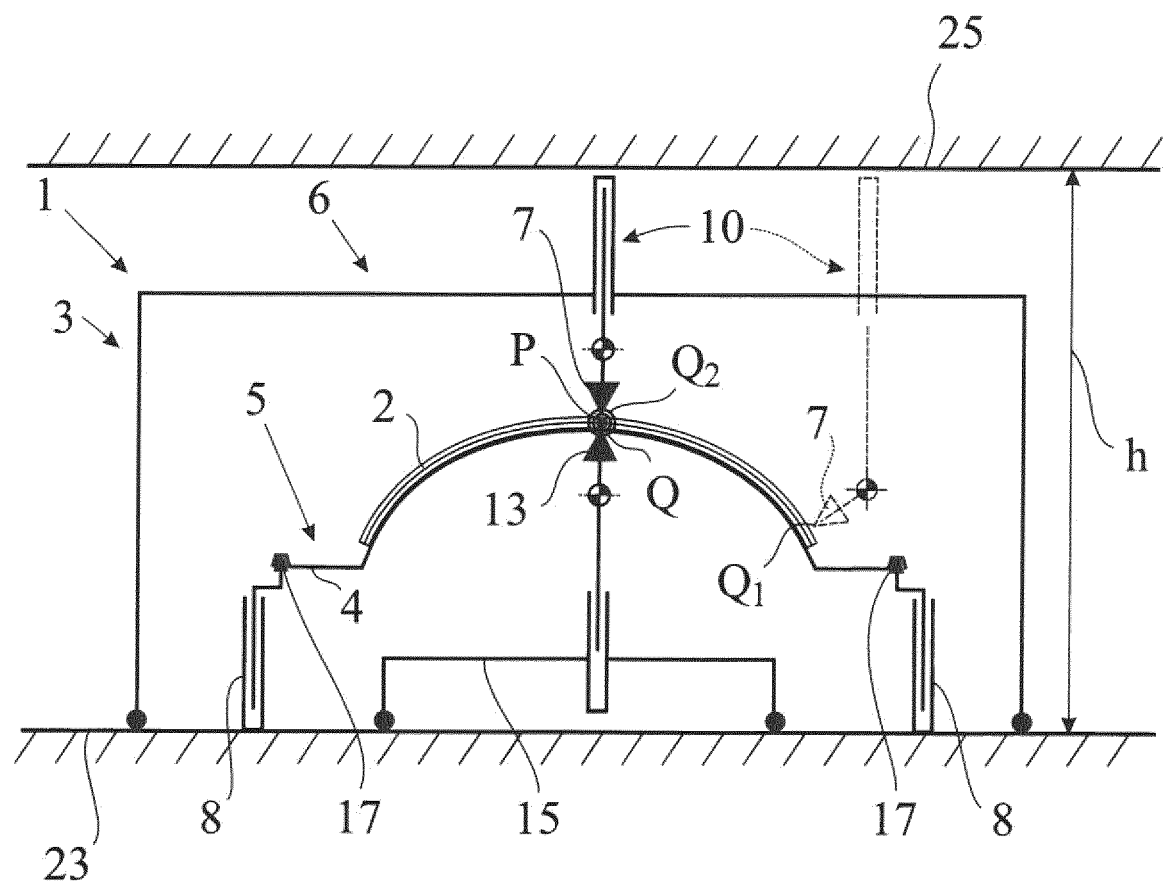
FIG. 3 shows the processing station from FIG. 2 when processing a first processing location, in a front view.
Figure 4:
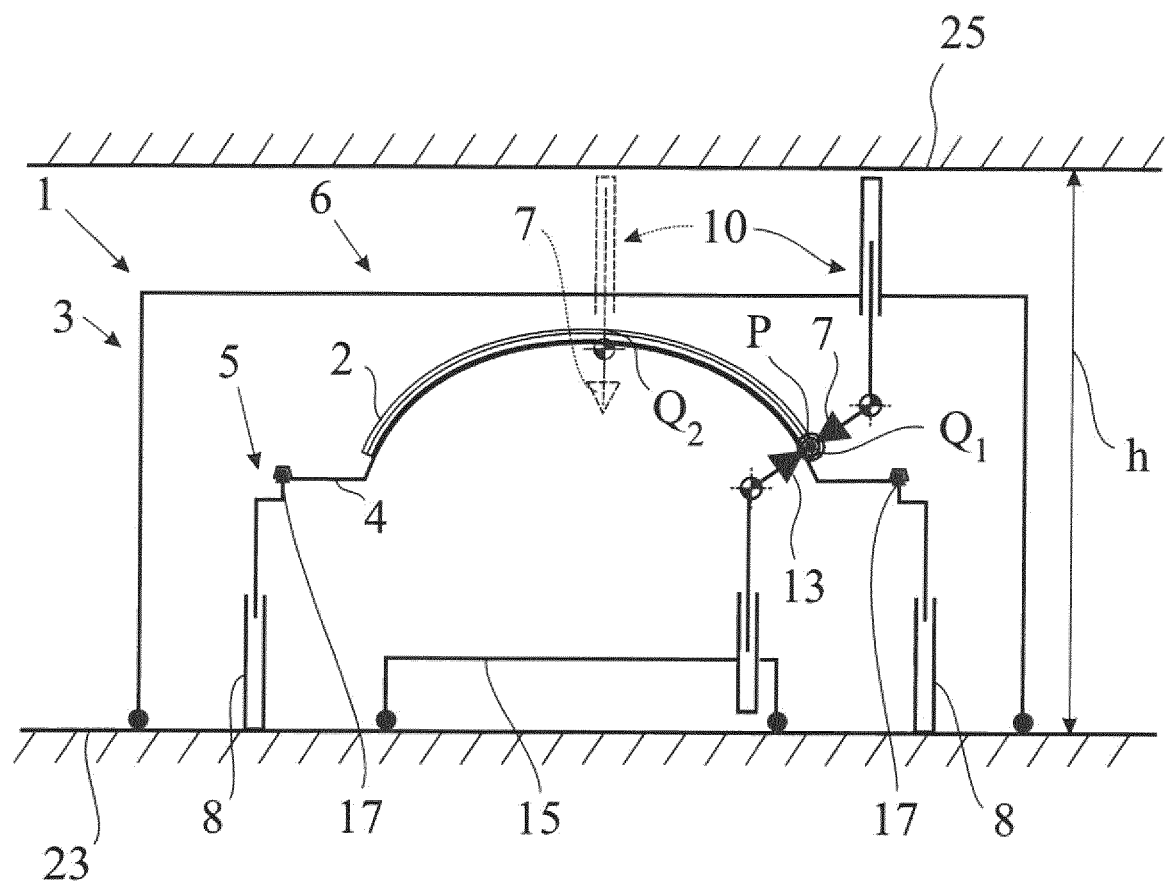
FIG. 4 shows the processing station from FIG. 2 when processing at a second processing location.

While the processing location Q1 cannot be reached in FIG. 3 since the linear height guide 10 is too short, the upper processing location Q2 cannot be reached in the position of FIG. 4 since the component 2 and the processing tool 7 configured as the upper tool 7 would collide herein. This case is shown by dashed lines in FIG. 4.

The processing station 1 is nevertheless specified and configured in such a manner that the component 2 is processable at the two processing locations Q1, Q2 by the gantry processing machine 3 by way of a height adjustment of the clamping frame 4, as becomes evident from both FIGS. 3 and 4. The processing steps that are to be carried out in the upper region of the component 2 can be processed in a lowered position of the holding device assembly 4, as is shown in FIG. 3. The processing steps that are to be carried out in the lower region of the component 2 can be processed in a higher position of the holding device assembly 4, as is shown in FIG. 4. As can be likewise seen in these two figures, a higher gantry processing machine 3 cannot be used here for enlargement, since a higher machine cannot be set up by virtue of the low ceiling height h. An enlargement of the overall adjustment range is thus possible by the height adjustment of the clamping frame 4 by means of the holding devices 8.

The gantry 6 has two columns 6b, the crossbeam 6a being disposed therebetween. The gantry 6 presently is configured as a double gantry. However, said gantry 6 can also be configured as a single gantry.

Figure 2:
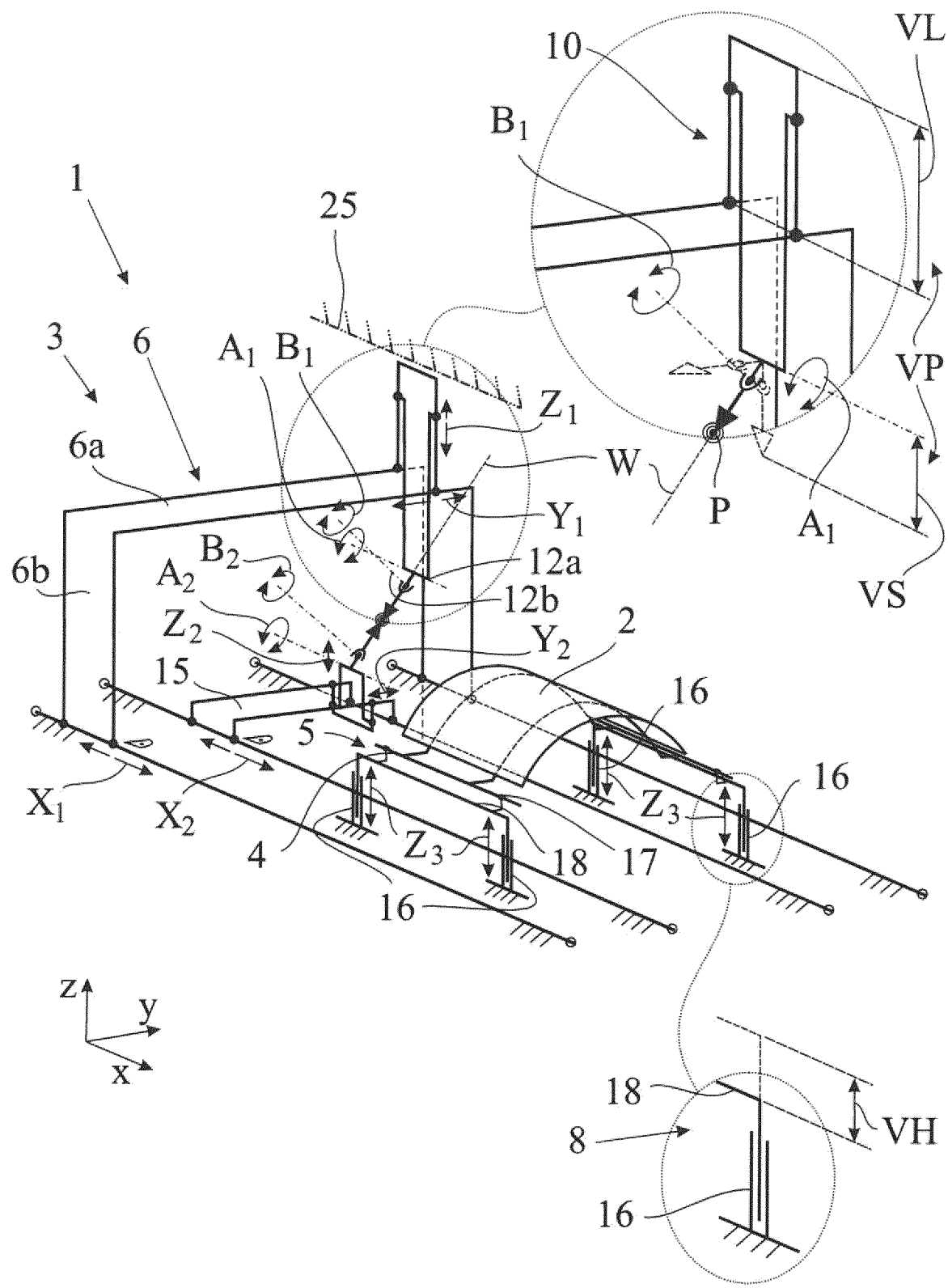
FIG. 2 shows a schematic illustration of the processing station from FIG. 1, in a perspective view.

The gantry 6 of the processing station 1 can be configured so as to be stationary or repositionable. The gantry 6 presently is repositionable in a x direction which is disposed so as to be orthogonal to the z direction and additionally can likewise be disposed so as to be orthogonal to a crossbeam 6a of the gantry 6. The gantry 6 can be repositionable in a guide. The movement axis in the schematic illustration of FIG. 2 is the X1 axis.

The crossbeam 6a of the gantry 6 can extend in a y direction. The linear height guide 10 is repositionable on the crossbeam 6a along an axis Y1 in the y direction, as is shown in FIG. 2.

The directions x, y, and z presently define a Cartesian coordinate system.

The height adjustment of the processing tool 7 in turn is performed by way of the linear height guide 10. The processing tool 7 is configured so as to be pivotable in relation to said linear height guide 10 and thus also in relation to the gantry 6. To this end, the gantry processing machine 3 for pivoting the processing tool 7 in relation to the gantry 6 has a pivoting assembly 11 which is provided in particular so as to be parallel with a plane that is defined by the gantry 6, wherein the pivoting assembly 11 can have a pivot bearing 12a, and in some embodiments a second pivot bearing 12b, for pivoting the processing tool 7 in relation to the gantry 6. Additionally or alternatively, the pivoting assembly 11 can have a non-linear guide (not shown) for pivoting the processing tool 7 in relation to the gantry 6.

The processing tool 7 in relation to the crossbeam 6a can be repositionable in particular along a linear guide or along the non-linear guide.

The processing tool 7 in the exemplary embodiment is initially pivotable about an axis A1 which runs so as to be parallel with the x direction. The pivoting assembly 11 can additionally also provide a further pivot axis, as is the case in the exemplary embodiment. The processing tool 7 here is additionally pivotable about a B1 axis. The alignment of the pivot axis B1 depends on the pivoted position about the A1 axis. The B1 axis can lie in a plane through the gantry 6.

The processing tool of the processing machine in relation to the gantry can thus be pivotable about the processing point in such a manner that a processing point can be approached by the processing tool in at least two different angular positions of the processing tool in relation to the x axis, and/or in at least two different angular positions of the processing tool in relation to the y axis.

The pivotable processing tool 7 can be an upper tool 7. The gantry processing machine 3 furthermore can have a lower tool 13, wherein the upper tool 7 and the lower tool 13 form a tool assembly 14. The lower tool 13 can be configured so as to be stationary or be repositionable in particular in the x direction, the latter being the case in the exemplary embodiments. The lower tool 13 can be repositionable in particular in the x direction, on a slide 15 of the gantry processing machine 3. A movement of the slide 15 can be guided by a guide.

The lower tool 13 presently has the same degrees of freedom in terms of movement as the upper tool 7. Said lower tool 13 in the x direction is repositionable by the slide 15 along the axis X2. The lower tool 13 in relation to the slide 15 can be repositioned both in the y direction along the axis Y2 as well as in the z direction along the axis Z2. The lower tool 13, by way of a pivoting assembly, is likewise pivotable about an axis A2 and an axis B2 in relation to a linear height guide 10 of the slide 15. The axes can be arranged analogously to the corresponding axes A1 and B1 of the portal 6.

The upper tool 7 and the lower tool 13 interact for processing the component 2. Said upper tool 7 and lower tool 13 can have a common processing point P. While the upper tool 7 and the lower tool 13 can be be repositionable in a mutually independent manner, the upper tool 7 and the lower tool 13 presently can be coupleable in terms of control technology such that said upper tool 7 and said lower tool 13 form a common tool operation axis W and maintain the latter when being repositioned.

The processing tool 7 or the upper tool 7, respectively, and/or the lower tool 13 can rotate about a tool axis W and/or for processing the component 2 can carry out a feed movement along the tool axis W in the direction of said component 2.

The upper tool 7 can have a boring tool and/or a riveting tool. An in particular automatic tool changing installation can furthermore be provided. The lower tool 13 can be configured as a counter bearing. Said lower tool 13 can have a feed member (not shown) for riveting. Of course, in the context of a reversal of the movements, the lower tool 7 can also have a boring tool and/or a riveting tool and optionally an in particular automatic tool changing installation. In this case, the upper tool can form a counter bearing, optionally having a feed member.

Having described the processing machine 3 hereabove, the holding device assembly 5 is now to be discussed.

At least one holding device 8 can extend in a longitudinal manner and by way of the longitudinal side thereof is aligned along the x direction. Additionally or alternatively, the clamping frame 4 can extend in a longitudinal manner and be received in the holding device assembly 5 in such a manner that the longitudinal side of said clamping frame 4 is directed in the x direction. In some embodiments, the lower tool 13, in particular the slide 15, is disposed between the holding devices 8. The lower tool 13 in this instance can process the component 2 without comparatively large adjustment parts for moving below the holding devices 8. These features of the lower tool 13 are of course conceivable also in the case of holding devices 8 or clamping frames 4, respectively, that do not extend in the x direction.

The holding devices 8 and/or clamping frames 4 can be capable of being crossed overhead in an in particular complete manner by the gantry 6. Additionally or alternatively, the holding devices 8 and/or clamping frames 4 are capable of being crossed underneath in an in particular complete manner by the slide 15.

The holding devices 8 can have in each case at least one lifting element 16, such as two lifting elements 16, wherein the lifting elements 16 are individually driven and/or individually controllable. Decentralized and very flexible controlling of the holding device 8 is enabled on account thereof. However, the lifting elements 16 can also be operable in a synchronized manner.

The drive 9 of the holding devices 8 or of the lifting elements 16, respectively, can be conceived so as to be motorized, hydraulic, and/or pneumatic. To this end, the lifting elements 16 have a threaded spindle drive. The lifting elements 16 can be in each case configured as telescopic elements. In principle however, the implementation of a lifting element 16 in the manner of a scissor lift, for example, is also conceivable. The lifting element 16 can extend and/or moves so as to be substantially orthogonal to a plane through the clamping frame 4, in particular so as to be parallel with the z direction.

The holding device assembly 5 can have at least three, in particular at least four, lifting elements 16. In order to obtain a particularly stable footing and kinematics that can be readily regulated, the holding device assembly 5 can have precisely four lifting elements 16. However, precisely six or precisely eight lifting elements 16 can also be provided, for example. The holding device assembly 5 can have precisely two holding devices 8. Independently thereof, the holding devices 8 can be unconnected or else be connected by stays, for example, in particular by cross stays. The two holding devices 8 in the exemplary embodiment are unconnected.

The holding device assemblies 5 can have at least two receptacles 17 for receiving the clamping frame 4. The receptacles 17 for receiving different clamping frames 4 can be disposed so as to be in particular displaceable or repositionable on the holding device assembly 5. The holding devices 8 can have a support 18 on which the receptacles can be disposed so as to be fixed and/or displaceable and/or repositionable. The receptacles in the exemplary embodiment are disposed so as to be displaceable in the x direction. However, said receptacles can also be configured so as to be repositionable in the x direction. The clamping frame 4 can be releasably fixed to the holding device 8.

The support 18 is supported by two lifting elements 16. The two lifting elements 16 and the support 18, together with the receptacle 17 assigned to the latter, form a holding device 8.

The receptacles 17 can be configured as a frame clamping system for receiving the clamping frame 4 in a releasably fixable manner. Additionally or alternatively, the processing station 1 can have a controller 19 for the height adjustment of the clamping frame 4. The processing station 1 can in particular have a controller 19, in particular an NC controller, for the motion control of the gantry processing machine 3 and/or of the holding device assembly 5. The motion control of the holding device assembly 5 and the motion control of the gantry processing machine 3 can be coupled, in particular functionally coupled. In this way, the processing process including the movements of both the gantry processing machine 3 as well as of the holding device assembly 5 can be controlled by a single NC controller 19.

The upper tool 7 and the lower tool 13 can be intercoupled in terms of movement by way of the controller 19, in particular by way of the NC controller, can be coupled in terms of movement in such a manner that the tool axis W1 of the upper tool 7 and the tool axis W2 of the lower tool 13 in the repositioning of the upper tool 7 and lower tool 13 are oriented, or remain oriented, respectively, so as to be aligned in a coaxial manner in particular toward the processing point P.

Figure 5:
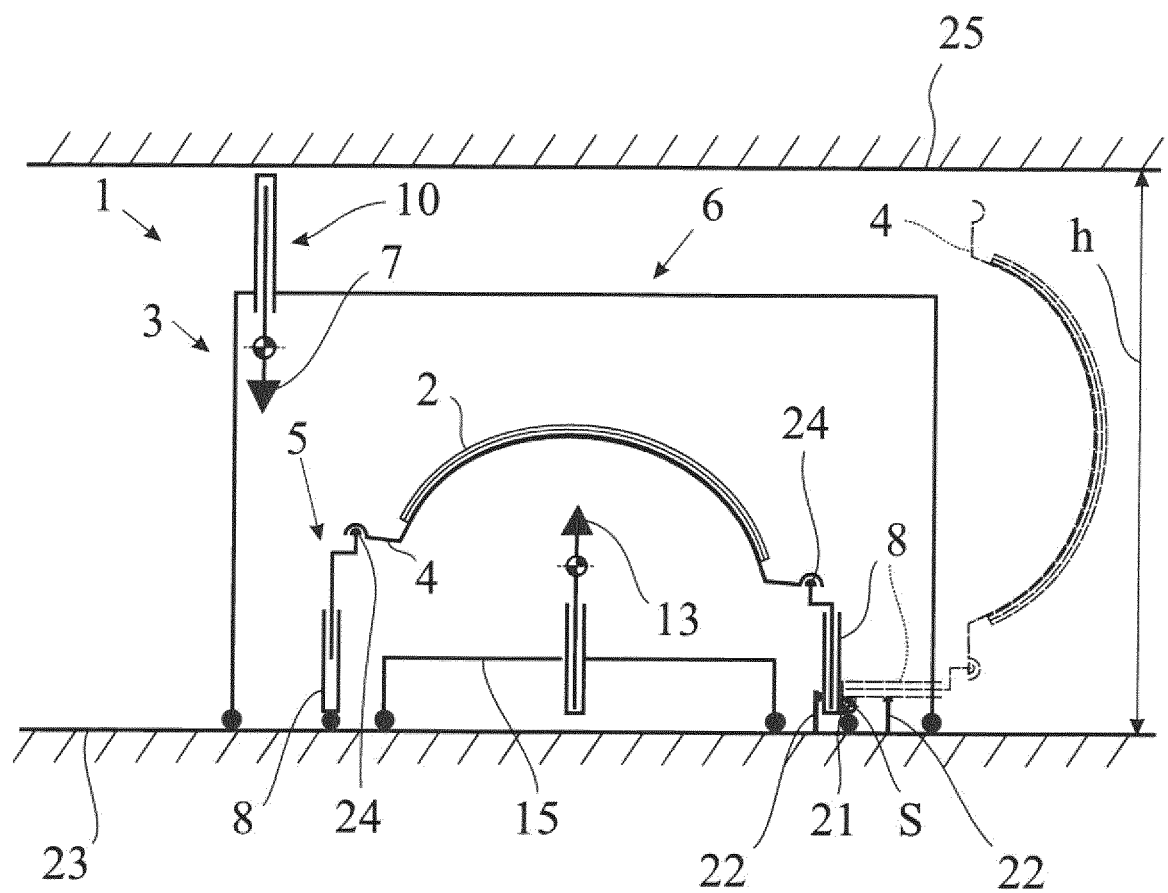
FIG. 5 shows a processing station according to a further exemplary embodiment, in a schematic illustration in a front view.

A further exemplary embodiment which differs substantially from that of FIGS. 1 to 4 in three points is illustrated in FIG. 5. However, these three features can in each case also be applied individually.

First, at least one holding device 8 has a pivot joint 21 for pivoting the clamping frame 4. The pivot joint 21 can be lockable, in particular in the terminal pivot positions. Detents 22 can be provided in the terminal pivot positions for locking and/or holding the holding device 8. The pivot axis of the pivot joint 21 can lie outside an envelope curve of the component 2 when pivoted about the pivot axis S. The pivot joint 21 can be pivotable only about one stationary axis. However, it is also conceivable that the pivot joint 21 is pivotable about a plurality of axes, for example when said pivot joint 21 is configured as a ball joint.

Second, at least one holding device 8 can have at least one joint 24, in particular a ball joint, for pivotably articulating the clamping frame 4 about the x axis and/or y axis. The holding device 8 furthermore can have a positioning element (not shown) for aligning the joint 24 or the joints 24, respectively, in a defined manner in a loading/unloading position for loading and/or unloading the holding device assembly 5 with a clamping frame 4. Each lifting element 16 in the exemplary embodiment of FIG. 5 has one joint 24. The joints 24 serve for holding the clamping frame 4 in a defined manner in the case of holding devices 8 and/or lifting elements 16 that are set at different heights. The holding devices 8 between the receptacles 17 thereof can have length equalization installations (not shown) such that the clamping frame 4 is held reliably and in a defined position also in various angular positions.

Third, at least one holding device 8, in particular the holding device assembly 5, can be repositionable. All holding devices 8 of the holding device assembly 5 in the exemplary embodiment of FIG. 5 are repositionable. The holding devices 8 or the holding device assemblies 5 can be repositionable in the x direction.

Loading and unloading of the holding device assembly 5 of FIG. 5 can be performed in two different ways.

On the one hand, the holding devices 8 can be moved into a loading/unloading position in which a positioning element holds the joints 24 in a defined position. The latter can be a fully lowered position of the holding devices 8, for example. The clamping frame 4 can thereafter be loaded onto and/or unloaded from the receptacles.

On the other hand, the clamping frame 4 by means of the pivot joint 21 can be pivoted to another loading/unloading position. The clamping frame herein, as is shown in FIG. 5, can be pivoted beyond the guide of the gantry 6. On account thereof, the clamping frame 4 can be very easily set down and/or picked up, for example with a floor-borne transportation vehicle, for loading and/or unloading the processing station 1. If the gantry processing machine 3 is loaded and unloaded with a floor-borne transportation vehicle, no repositioning space has to be provided for a crane between the gantry processing machine 3 and the ceiling 25, such that the gantry processing machine 3 can be conceived to be higher.

The processing stations 1 proposed enable a compact machine design with a high component flexibility and a large adjustment range, and thus a productive and cost-effective manufacturing of various, even very large aircraft structural components.

The invention claimed is:

1. A processing station for aircraft structural components, comprising:
    a gantry processing machine,
    a clamping frame for fastening at least one of the aircraft structural components, and
    a holding device assembly for receiving the clamping frame,
    wherein the gantry processing machine has a gantry, which is movable in a horizontal x direction relative to the clamping frame, wherein the gantry comprises a first column, a second column, and a crossbeam, the crossbeam extending in a horizontal y direction from the first column to the second column and the crossbeam also extending in a vertical z direction and being located above the clamping frame,
    wherein a linear height guide is repositionable on the crossbeam along an axis that extends in the y direction, and the gantry supports a processing tool which defines a processing point, wherein the processing tool is height adjustable in the z direction in relation to the gantry via the linear height guide such that the processing tool is able to displace the processing point, and wherein the processing tool is configured to be pivotable in relation to the linear height guide and also in relation to the gantry,
    wherein the holding device assembly has at least two holding devices, and wherein at least one holding device of the at least two holding devices has a drive for a height adjustment, and the clamping frame is height-adjustable in the z direction by means of the at least one holding device,
    wherein the pivotable processing tool is an upper tool, and the gantry processing machine further has a lower tool, and the upper tool and the lower tool form a tool arrangement,
    wherein the gantry extends in the z direction and is located over and above the holding device assembly,
    wherein the gantry is movable in the x direction along a first set of tracks and the lower tool is movable in the x direction along a second set of tracks,
    wherein, with respect to the y direction, the holding device assembly is mounted inside the first set of tracks and outside of the second set of tracks, and
    wherein the clamping frame is disposed over and above the second set tracks so as to extend in the y direction across said second set of tracks.

2. The processing station as claimed in claim 1, wherein the processing tool of the gantry processing machine is pivotable in relation to the gantry in such a manner that the processing point or a different processing point can be approached by the processing tool in at least two different angular positions of the processing tool.

3. The processing station as claimed in claim 1, wherein the holding device assembly comprises the at least two holding devices having in each case at least one drive for the height adjustment, and the clamping frame is height adjustable in the z direction by the at least one holding device.

4. The processing station as claimed in claim 1, wherein the gantry processing machine has a respective adjustment range in the z direction, and the holding device assembly, conjointly with the clamping frame, has a respective adjustment range in the z direction.

5. The processing station as claimed in claim 4, wherein the processing station is specified and configured in such a manner that the at least one of the aircraft structural components has a defined contour, which is to be processed at at least two processing locations by the gantry processing machine by means of a height adjustment of the clamping frame, and
    wherein the at least two processing locations in the z direction are spaced apart by more than the size in the z direction of the adjustment range of the gantry processing machine for the at least one of the aircraft structural components.

6. The processing station as claimed in claim 4, wherein the two adjustment ranges overlap in such a manner that a consistent processing location of the at least one of the aircraft structural components is processable by way of the gantry processing machine in a higher position and a lower position of the at least one holding device, respectively, in the z direction.

7. The processing station as claimed in claim 1, wherein the gantry processing machine is a boring machine or a riveting machine or a boring and riveting machine.

8. The processing station as claimed in claim 1, further comprising:
    a pivoting arrangement for pivoting the processing tool in relation to the gantry, so as to be parallel with a plane that is defined by the gantry.

9. The processing station as claimed in claim 8, wherein the pivoting arrangement has a pivot bearing and/or a non-linear guide for pivoting the processing tool in relation to the gantry.

10. The processing station as claimed in claim 1, wherein the at least one holding device extends in a longitudinal manner and by way of a longitudinal side thereof is aligned along the x direction, and/or wherein the clamping frame extends in a longitudinal manner and is received in the holding device assembly in such a manner that a longitudinal side of said clamping frame is aligned in the x direction.

11. The processing station as claimed in claim 1, wherein the lower tool is disposed between the at least two holding devices.

12. The processing station as claimed in claim 1, wherein the at least two holding devices have in each case at least one lifting element for the height adjustment, wherein the at least one lifting element is individually driven and/or is individually controllable.

13. The processing station as claimed in claim 1, wherein the at least one holding device of the holding device assembly is/are repositionable.

14. The processing station as claimed in claim 1, wherein the holding device assembly comprises at least two receptacles for receiving the clamping frame, and wherein the at least two receptacles are configured so as to be displaceable and/or repositionable on the holding device assembly for receiving different clamping frames.

15. The processing station as claimed in claim 1, wherein the processing station has a controller for the height adjustment of the clamping frame, and/or wherein the processing station has a controller for a motion control of the gantry processing machine and/or of the holding device assembly.

16. The processing station as claimed in claim 1, wherein at least one holding device of the at least two holding devices has a pivot joint for pivoting the clamping frame.

17. The processing station as claimed in claim 1, wherein the gantry is movable in the x direction which is disposed so as to be orthogonal to the z direction.

18. The processing station as claimed in claim 17, wherein the x direction is disposed so as to be orthogonal to the crossbeam of the gantry.

19. The processing station as claimed in claim 1, wherein the gantry and the lower tool are separately mounted on a floor.

* * * * *